(12) United States Patent
Zaki et al.

(10) Patent No.: US 7,867,319 B2
(45) Date of Patent: Jan. 11, 2011

(54) FILLED EPOXY TUBESHEET

(75) Inventors: Rehan Zaki, Naperville, IL (US);
Stephen Yates, Arlington Heights, IL (US); Tihomir Tonev, Des Plaines, IL (US)

(73) Assignee: Honeywell International Inc., Morristown, NJ (US)

( * ) Notice: Subject to any disclaimer, the term of this patent is extended or adjusted under 35 U.S.C. 154(b) by 360 days.

(21) Appl. No.: 12/060,685

(22) Filed: Apr. 1, 2008

(65) Prior Publication Data

US 2009/0246429 A1 Oct. 1, 2009

(51) Int. Cl.
*B01D 53/22* (2006.01)

(52) U.S. Cl. .................. 95/45; 96/4; 96/8; 96/10; 55/510; 55/DIG. 5; 210/321.8; 210/321.89; 210/500.23

(58) Field of Classification Search ........ 96/4, 96/8, 10; 95/45; 55/510, DIG. 5; 210/321.6, 210/321.8, 321.88, 321.89, 500.23
See application file for complete search history.

(56) References Cited

U.S. PATENT DOCUMENTS

| | | | |
|---|---|---|---|
| 4,268,473 A | 5/1981 | Bower et al. | |
| 4,323,454 A * | 4/1982 | Fritzsche et al. | 96/8 |
| 4,677,144 A | 6/1987 | Yasuda et al. | |
| 5,202,023 A * | 4/1993 | Trimmer et al. | 96/8 |
| 5,211,728 A * | 5/1993 | Trimmer | 210/321.8 |
| 5,234,590 A * | 8/1993 | Etienne et al. | 210/321.61 |
| 5,779,897 A * | 7/1998 | Kalthod et al. | 96/8 |
| 5,927,851 A | 7/1999 | Carlson | |
| 6,270,714 B1 * | 8/2001 | Azran et al. | 264/443 |
| 6,290,756 B1 * | 9/2001 | Macheras et al. | 96/8 |
| 6,491,739 B1 | 12/2002 | Crome et al. | |
| 6,548,189 B1 | 4/2003 | Gunasekaran et al. | |
| 6,663,745 B1 * | 12/2003 | Cheng et al. | 210/321.8 |
| 7,005,100 B2 * | 2/2006 | Lowell | 264/263 |
| 7,160,455 B2 * | 1/2007 | Taniguchi et al. | 210/321.88 |
| 2005/0235826 A1 | 10/2005 | Jensvold et al. | |
| 2006/0011063 A1 | 1/2006 | Zhou | |
| 2006/0084727 A1 | 4/2006 | Yan et al. | |
| 2007/0232727 A1 | 10/2007 | Lin et al. | |

* cited by examiner

*Primary Examiner*—Jason M Greene
(74) *Attorney, Agent, or Firm*—Oral Caglar, Esq.

(57) ABSTRACT

A filled epoxy tubesheet comprises an epoxy filled with a metal, such as aluminum flakes. Embodiments of the filled epoxy tubesheets can bend due to stress on the surface rather than crack. Embodiments of the filled epoxy tubesheet can be used to improve Air Separation Module performance by reducing or eliminating leakage through crack in the tubesheet.

19 Claims, 10 Drawing Sheets

FILLED EPOXY TUBESHEET

BACKGROUND OF THE INVENTION

The present invention generally relates to Air Separation Modules (ASM) and, more particularly, to tubesheets for ASMs.

ASMs have been used in gas generating systems, such as On Board Inert Gas Generating Systems (OBIGGS). Aircraft have used OBIGGS to protect against fuel tank explosions by replacing the potentially explosive fuel vapor/air mixture above the fuel in the ullage space of the tanks with nitrogen enriched air (NEA). The OBIGGS may pass air (e.g. bleed air) through the ASMs, generating the NEA and a stream of oxygen enriched air (OEA). The resulting NEA can be used to inert fuel tanks while the OEA can be recaptured or vented overboard.

The ASM can include a housing having an inlet, an OEA outlet and a NEA outlet. The ASM may include a bundle of hollow fiber membranes positioned within the housing. At least one end of the fiber bundle may be cast or potted in what is commonly referred to as a tubesheet. More commonly, both ends of the fiber bundle may be so encapsulated.

The ASM may be based on permeable membrane (PM) technology. Air at a certain temperature and pressure may enter the housing through the inlet and pass through the bundle of hollow fiber membranes. Oxygen may be separated from the air flow due to diffusion through the fiber walls because the fiber walls may be more permeable to oxygen than to nitrogen. As the air flow travels through the ASM, the NEA flow may be generated by the loss of oxygen via permeation through the fiber wall. The tubesheet(s) may serve to hold the fibers in a fluid-tight relationship such that the NEA flow may be isolated from the OEA flow. The NEA flow may exit the housing through the NEA outlet and the OEA flow may exit through the OEA outlet.

For some ASMs, the operating temperature may be between 140° F. and 220° F. and the pressure difference between the two sides of the tubesheet may be 20 to 60 psig. During use, the module cycles between the operating temperature and ambient every flight. The temperature fluctuation may result in tubesheet cracks after a few thermal cycles. Once cracked, air starts leaking through the cracks, bypasses the membrane and mixes with the NEA, and therefore the desired concentration of nitrogen cannot be achieved.

As can be seen, there is a need for improved tubesheets. Further, tubesheets having a reduction in tubesheet cracking due to thermal cycles are needed. Tubesheets are needed that can improve the separation selectivity of ASMs by reducing tubesheet leakage.

SUMMARY OF THE INVENTION

In one aspect of the present invention, a tubesheet comprises a polymer component; and a fill component disposed within the polymer component.

In another aspect of the present invention, a tubesheet comprises an aluminum filled epoxy.

In a further aspect of the present invention, a method of securing a supply of fibers comprises the step of preheating a supply of resin and a supply of hardener to provide a supply of preheated resin and a supply of preheated hardener; mixing a first portion of the preheated resin with a first portion of the preheated hardener to provide a first portion of filled epoxy; wetting the supply of fibers with the first portion of filled epoxy to provide a supply of wetted fibers; mixing a second portion of the preheated resin with a second portion of the preheated hardener to provide a second portion of filled epoxy; and potting the supply of wetted fibers in the second portion of filled epoxy to provide a supply of potted fibers.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides filled epoxy tubesheets and methods for producing the same. Embodiments of the present invention may find beneficial use in industries such as the aerospace, gas separation, microfiltration, and ultrafiltration industries. Embodiments of the present invention may be useful in applications including OBIGGS for inerting fuel tanks. Embodiments of the present invention may be useful in any gas separation application including, but not limited to, ASMs for aircraft.

In one embodiment, the present invention provides a filled epoxy tubesheet for an ASM. Unlike the prior art tubesheets that comprise unfilled epoxy, the present invention may comprise an epoxy filled with a metal, such as aluminum flakes. Unlike the prior art tubesheets that fail due to cracking from stress, the filled epoxy tubesheets of the present invention can bend due to stress on the surface rather than cracking. As used herein, bending refers to creep or movement in a direction about perpendicular to the surface of the tubesheet without the formation of cracks which propagate perpendicular to the surface and generate leaks. Prior art unfilled epoxy tubesheets may be more rigid or brittle and tend to crack under stress and temperature. These initial cracks can continue to grow, eventually allowing leakage through the tubesheet that results in a reduction in separation selectivity of the ASM. With embodiments of the present invention, on the other hand, if cracks appear on the surface they may not continue throughout the length of the tubesheet. This is unlike the prior art.

Figure 1:
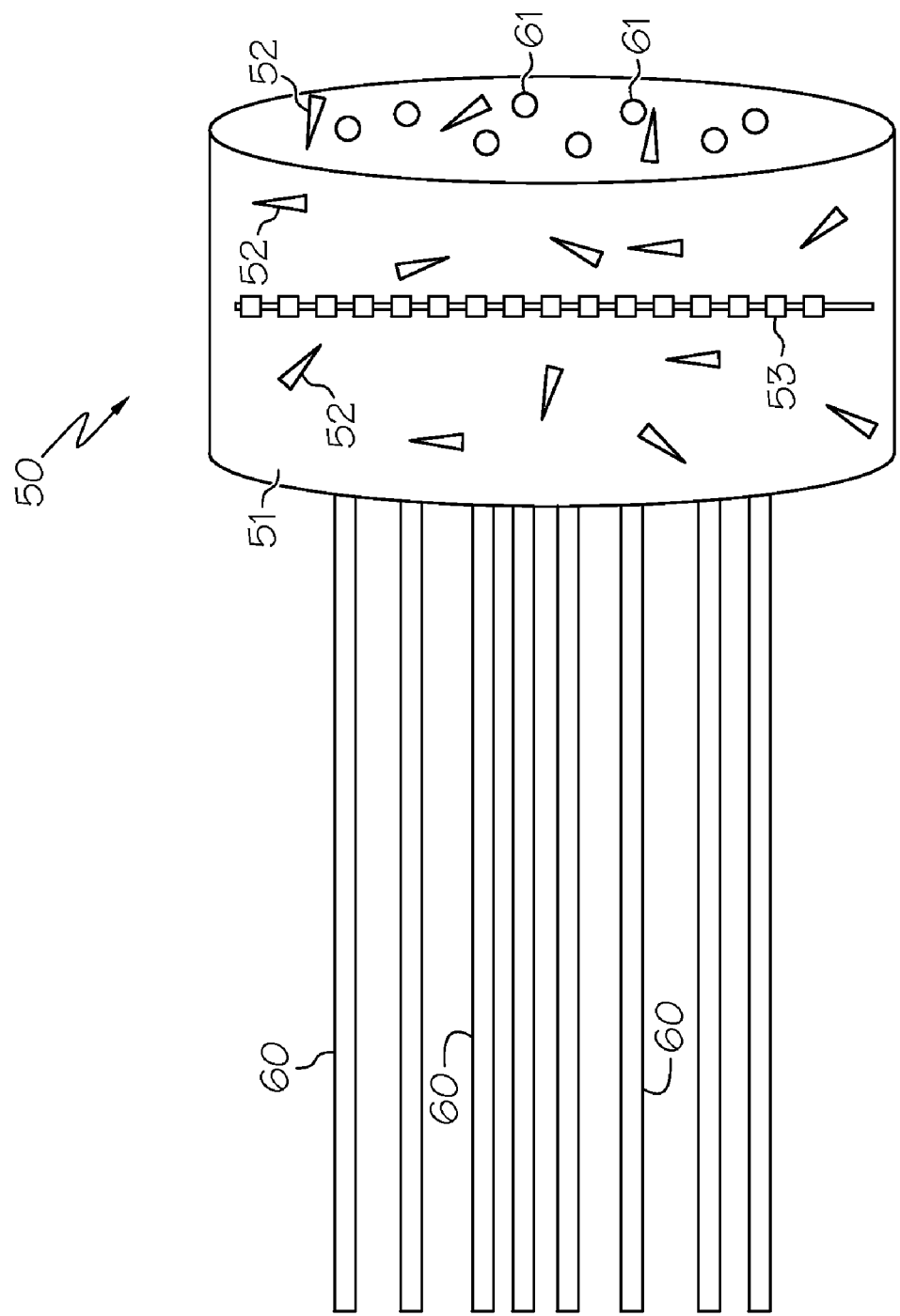
FIG. 1 is a perspective view of a filled epoxy tubesheet according to one embodiment of the present invention embedded with a plurality of hollow fiber membranes.

A tubesheet 50, according to an embodiment of the present invention is shown in FIG. 1. In FIG. 1, a plurality of hollow fiber membranes 60 (fiber bundle) are potted in the tubesheet 50. Each hollow fiber membrane 60 may include a bore 61 that extends in a fluid communication relationship through the tubesheet 50. The tubesheet 50 may comprise an polymer component 51 and a fill component 52 disposed within the polymer component 51. For some embodiments, the tubesheet 50 may include an insert 53 positioned within the polymer component 51 to minimize creep.

The polymer component 51 may comprise known polymers, such as thermoset polymers. For some applications, the polymer component 51 may comprise epoxies and may include a resin material and a hardener material. As described in more detail below, the resin and hardener can be mixed together, potted and then cured to form the tubesheet 50. The composition of the polymer component 51 may vary with application and may depend on factors including the composition of the hollow fiber membranes 60 and the composition of the shell (not shown) of the ASM. For example, when the shell comprises aluminum and the hollow fiber membranes 60 comprise polyimide, the polymer component 51 may include epoxy. The polymer component 51 may show high adhesion to both the fibers 60 and the shell material. Although certain polymer components 51 are described herein, the invention is not limited and can be practiced using any suitable thermosetting resin-based material, including but not limited to epoxy resins.

The fill component 52 may be disposed within the polymer component 51. The fill component 52 may comprise known polymer fill materials. The fill component 52 may comprise between about 5% and about 20% by volume of the tubesheet 50. The fill component 52 can include, but is not limited to, metals such as aluminum, silver, nickel, copper, brass, and steel. For some embodiments, the fill component 52 may comprise fibers, flakes or particles. For some applications, the tubesheet 50 may include aluminum flakes of less than about 15 microns in size. For some embodiments, the fill component 52 may be between about 10 and about 20 microns in size.

The polymer component 51 and the fill component 52 may be components of commercially available filled epoxies. It was discovered that metal filled epoxy either with aluminum flakes or with other metal may provide some flexibility or ductility, and may survive for a longer time. Although less viscous unfilled epoxies may be more desirable for easy potting, they tend to be more brittle and are also more likely to crack due to thermal or physical shock. Filled epoxies may be less brittle and less likely to crack. The fill component 52 may provide strength and flexibility to the tubesheet 50.

Useful filled epoxies may have a tensile strength of at least about 2500 psi. For some embodiments, the filled epoxy may have tensile strength of between about 2500 and about 20000 psi. Useful filled epoxies may have a Coefficient of thermal expansion of between about $3.3 \times 10^{-5}/°$ C. and about $8.0 \times 10^{-5}/°$ C. For some applications, useful filled epoxies may have a Shore hardness of between about 75 and about 95. Useful filled epoxies may have a recommended maximum use temperature of at least about 400° F. Useful commercially available filled epoxies may include Aremco-Bond™ 568 and Duralco® 4540.

Aremco-Bond™ 568 comprises an aluminum filled epoxy material available from Aremco Products, Inc., P.O. Box 517, 707-B Executive Boulevard, Valley Cottage, N.Y. 10989. Aremco-Bond™ 568 may be a two-component epoxy that includes a hardener (568A) made of fatty acid polyamide and triethylenetetramine, and a resin (586B) that contains polyamide and bisphenol A diglycidyl ether as well as aluminum fibers. Aremco-Bond™ 568 may include about 20% aluminum in its composition. The size of the aluminum flakes may be about 20 microns. Aremco-Bond™ 568 may have tensile strength of 2500 psig, a Coefficient of thermal expansion of $5.9 \times 10^{-5}/°$ C., and a Shore hardness of 75. The recommended maximum use temperature for Aremco-Bond™ 568 may be about 400° F.

Duralco® 4540 comprises an aluminum filled epoxy material available from Cotronics Corporation, 3379 Shore Parkway, Brooklyn, N.Y. 11235. Duralco® 4540 may be a two-component epoxy that includes a hardener which is amine complex and modified epoxy resin. Duralco® 4540 may include about 10-15% aluminum in its composition. The size of the aluminum flakes may be about 20 microns. Duralco® 4540 may have a tensile strength of 10000 psi, a Coefficient of thermal expansion of $4.1 \times 10^{-5}/°$ C., and a Shore hardness of 80. The recommended maximum use temperature for Duralco® 4540 may be about 500° F.

Other useful commercially available filled epoxies may include HYSOL 9394 from Henkel Corporation, 2850 Willow Pass Road, Bay Point, Calif. 94565, EPOCAST 35A, 927 from Huntsman, 5121 San Femando Road West, Los Angeles Calif. 90039, and Duralco 4703 from Duralco Corporation, 3379 Shore Parkway, Brooklyn, N.Y. 11235. Although certain filled materials are described above, the invention is not so limited and can be practiced using any suitable resin-based material, including but not limited to epoxy resins, containing a metal fill component.

For some embodiments, the tubesheet 50 may include the insert 53 positioned within the polymer component 51. The insert 53 may comprise a metal retainer and may minimize creep during thermal cycles. For some embodiments, the insert 53 may comprise a circular grid shaped structure. For some embodiments, the insert 53 may comprise one or more bars positioned across the tubesheet 50 or may comprise a spiral shaped structure. The insert 53 may comprise a metal, such as aluminum. The insert 53 may be embedded in the polymer component 51 and positioned about perpendicular to the hollow fiber membranes 60.

Figure 2:
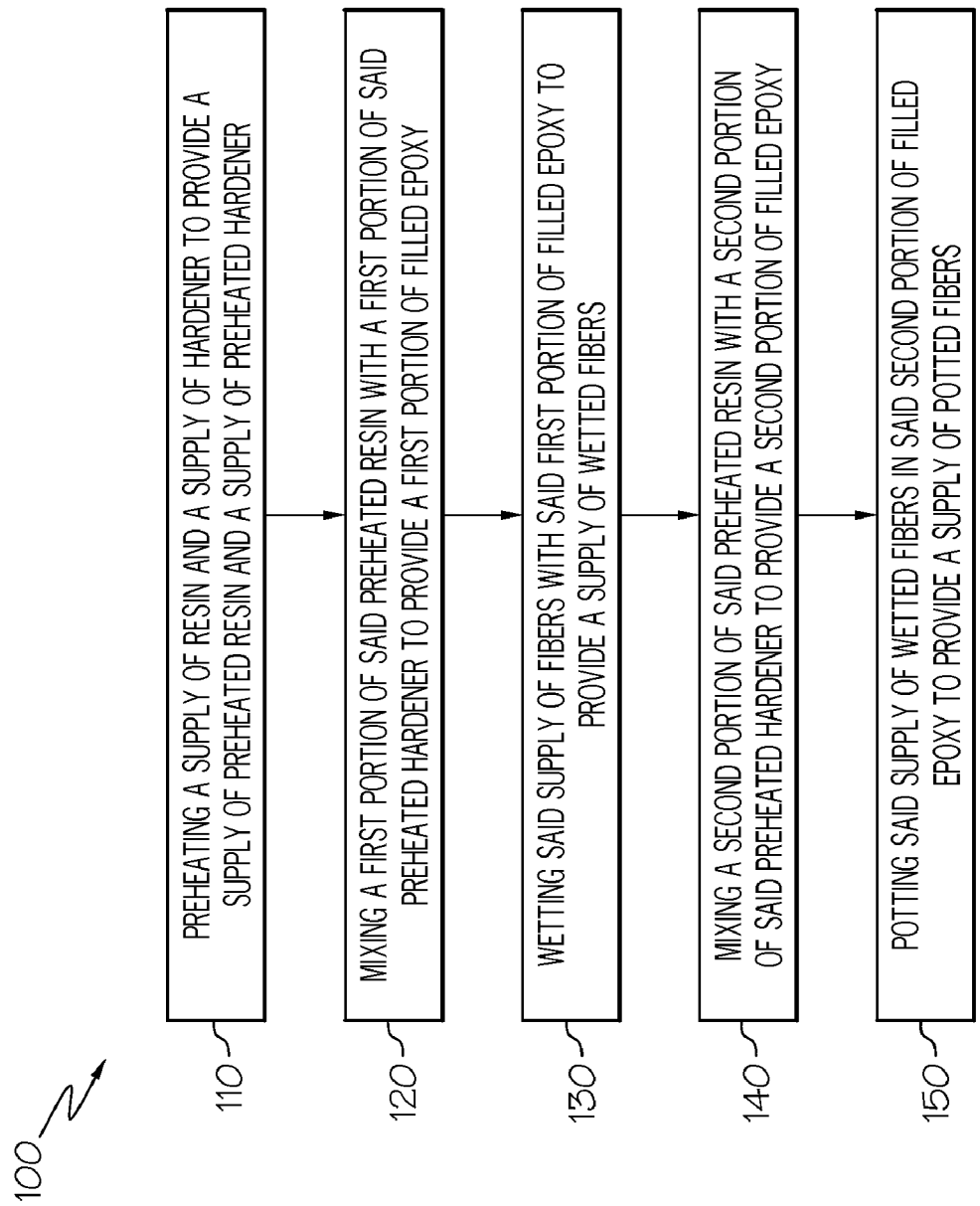
FIG. 2 is a flow chart of a method of securing a fiber bundle according to an embodiment of the present invention.

A method 100 of securing a supply of fibers is depicted in FIG. 2. For some applications, the supply of fibers may include fibers that have had their open ends plugged to prevent the filled epoxy from entering the bore 61 of the fiber 60. The method 100 may comprise a step 110 of preheating a supply of resin and a supply of hardener to provide a supply of preheated resin and a supply of preheated hardener; a step 120 of mixing a first portion of said preheated resin with a first portion of said preheated hardener to provide a first portion of filled epoxy; and a step 130 of wetting said supply of fibers with said first portion of filled epoxy to provide a supply of wetted fibers. The method 100 may further comprise a step 140 of mixing a second portion of said preheated resin with a second portion of said preheated hardener to provide a second portion of filled epoxy; and a step 150 of potting said supply of wetted fibers in said second portion of filled epoxy to provide a supply of potted fibers.

The step 110 of preheating a supply of resin and a supply of hardener to provide a supply of preheated resin and a supply of preheated hardener can comprise placing a supply of resin and a supply of hardener in an oven for one hour at 60° C. to reduce viscosity. The step 110 may reduce viscosity and may enable the epoxy to flow smoothly into the voids between fibers during potting.

The step 120 of mixing a first portion of said preheated resin with a first portion of said preheated hardener to provide a first portion of filled epoxy can comprise pouring a first portion of said preheated hardener into a first portion of said preheated resin and stirring.

The step 130 of wetting said supply of fibers with said first portion of filled epoxy to provide a supply of wetted fibers can comprise spooning said first portion of filled epoxy over said supply of fibers such that the ends of the fibers are coated with the first portion of filled epoxy. The step 130 of wetting said supply of fibers can include using a knife to spread the first portion of filled epoxy on the supply of fibers. The step 130 of wetting said supply of fibers may reduce voids between potted fibers.

The step 140 of mixing a second portion of said preheated resin with a second portion of said preheated hardener to provide a second portion of epoxy can comprise pouring a second portion of said preheated hardener into a second portion of said preheated resin and stirring.

The step 150 of potting said supply of wetted fibers in said second portion of filled epoxy to provide a supply of potted fibers can include clamping said supply of wetted fibers to a stand to provide a supply of clamped fibers; pouring said second portion of filled epoxy into a cylinder; positioning said cylinder beneath said supply of clamped fibers; and raising said cylinder such that said second portion of filled epoxy contacts said supply of clamped fibers. In lieu of raising the cylinder, the step 150 of potting said supply of wetted fibers in said second portion of filled epoxy can include lowering said supply of clamped fibers into said second portion of filled epoxy such that at least a portion of said supply of clamped fibers is immersed in said second portion of filled epoxy.

For some applications, the step 150 can include the use of an ultrasonic bath. For these applications, a module can be placed in the bath and the bath temperature can be maintained at about 40° C. The second portion of filled epoxy can be pumped by a syringe pump into the module from the bottom end at a very slow rate (e.g. 0.5 cm/min) so that voids between the fibers can be filled with epoxy. For some applications, the step 150 can include the use of a high pressure injection gun instead of the syringe pump. For some applications, the step 150 can include the use of a hand held vibration device during potting to remove air pockets within epoxy. Although the use of an ultrasonic bath or a hand held vibration device may increase the complexity of the method 100, they may be useful for some embodiments.

The step 150 of potting said supply of wetted fibers in said second portion of filled epoxy to provide a supply of potted fibers can include providing at least one o-ring groove to the supply of potted fibers. This may allow an o-ring 70 (see FIG. 3) to be incorporated in the ASM to maintain an airtight seal. O-rings have been incorporated into ASMs to provide the flexibility to withstand contraction and expansion during thermal cycles. O-rings 70 may be useful for applications where the thermal expansion and contraction for the housing (shell) and epoxy cannot be matched.

For applications including the insert 53, the step 150 of potting said supply of wetted fibers in said second portion of filled epoxy to provide a supply of potted fibers can include positioning the insert 53 in a cylinder and then pouring said second portion of filled epoxy into the cylinder.

EXAMPLE 1

Six three-inch modules were prepared, three with each epoxy, Aremco-Bond™ 568 and Duralco® 4540, for testing. While the actual tubesheet composites will contain many hollow fiber membrane strands, all oriented parallel to each other and collinear with the applied stress, this example substituted solid polyimide fibers to create a test sample which would not leak. The cast was created with solid fibers using the procedures described below.

Figure 3:
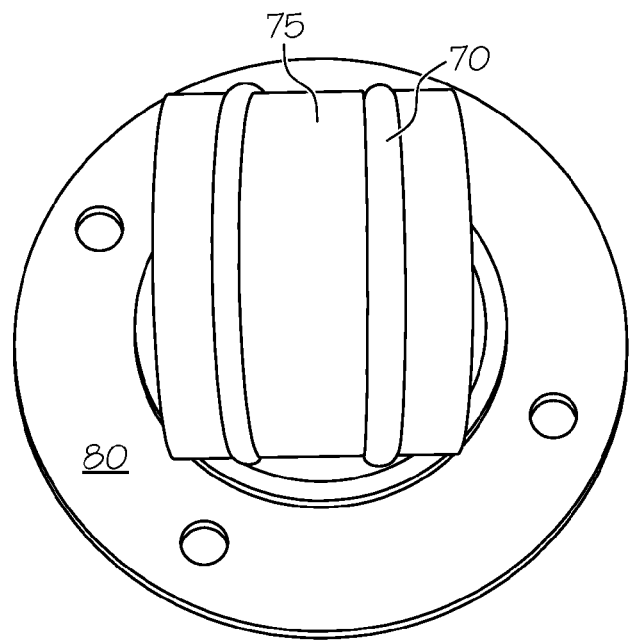
FIG. 3 is a perspective view of an epoxy cast according to one embodiment of the present invention.
Figure 4:
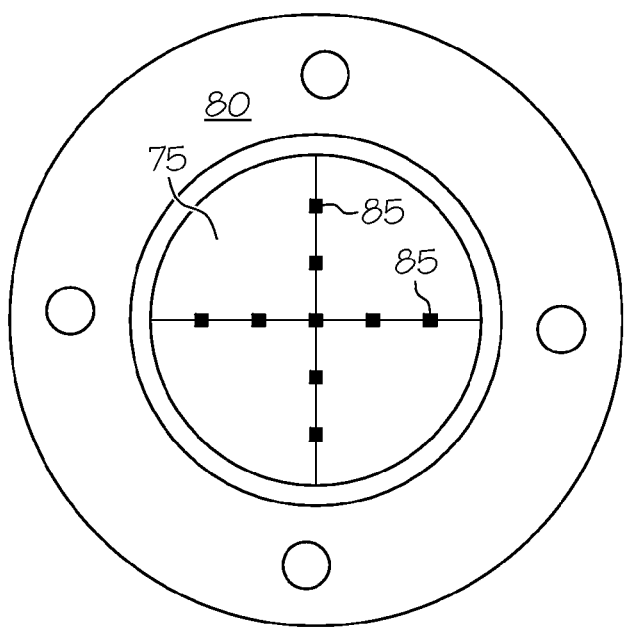
FIG. 4 is a perspective view of the epoxy cast of FIG. 3 positioned within an aluminum shell.

A 3" OD stainless steel cylinder of required length was placed on a flat surface, and one side was sealed with the flat plate using silicone glue. A thin sheet of Teflon® was slid to cover the inside surface of the cylinder. For Aremco-Bond™ 568, about 300 grams of epoxy resin was weighed into three separate containers and 300 grams of hardener into three other containers. The containers then were put in an oven for one hour at 60° C. to reduce viscosity. Meanwhile, the required fibers were put together and tied with tie rods to keep them in place for later use in potting. After one hour one container each of epoxy resin and hardener were removed from the oven. (The epoxy resin and hardener were now of reduced viscosity.) The two components (epoxy resin and hardener) were mixed thoroughly, and then used to wet the fibers. The fibers were spread out on the epoxy container and the epoxy was applied in such a way that the fibers were fully covered with epoxy. The wetted fibers were clamped so that they stayed in vertical position. Another 200 grams of resin and hardener were removed from the oven; they were mixed and poured it in the stainless steel cylinder. The cylinder then was placed on a lab jack under the clamped fibers. The cylinder was slowly raised until the wetted fibers were completely immersed in the epoxy. The fibers were aligned to the center of the cylinder and the excess epoxy was wiped from the cylinder. The resulting raw cast was cured by following the curing procedure recommended for each epoxy. Once cured the cast was removed from the cylinder by using a conventional mechanical press, and both ends were smoothed by cutting them with a circular saw. The final length was made to be 2.4 inches, which was the length of the testing module. Two grooves were machined for O-rings 70, then the cast 75 was inserted in an aluminum shell 80, as shown in FIGS. 3 and 4.

EXAMPLE 2

For long term testing, three modules were made with each epoxy, Aremco-Bond™ 568 and Duralco® 4540. The modules were made using the procedures described above for Example 1. The surface was mapped before the stress test by selecting five reference points 85 (FIG. 4) on each axis (x and y).

The modules were tested at three temperatures, 200° F., 230° F., and 260° F. by placing them in an oven. Pressure was maintained constant to 200 psig using compressed air, and the pressure was continuously monitored using transducers connected to each sample. Periodically, the test modules were removed from the oven, allowed cooling, and creep measurements were made using an optical measurement system model no. Sprint 150-300 by RAM Optical Instrumentation (ROI). Measurements were made at fixed points located by their x and y coordinates, and the variation in creep (z coordinate) was observed after each thermal cycle. When conducting creep measurements, it is important to make sure that the module position stays consistent, and creep was measured on the same selected points.

After every thermal cycle the modules were analyzed visually for any cracks that may have generated during cycles. The surface was carefully examined to see if more cracks were formed, also the length of the cracks was monitored to see if the lengths increased. The thermal cycles were repeated until the epoxy cracked or leaked. The modules were tested until leaks from the O-ring seals prevented further testing.

Figure 5:
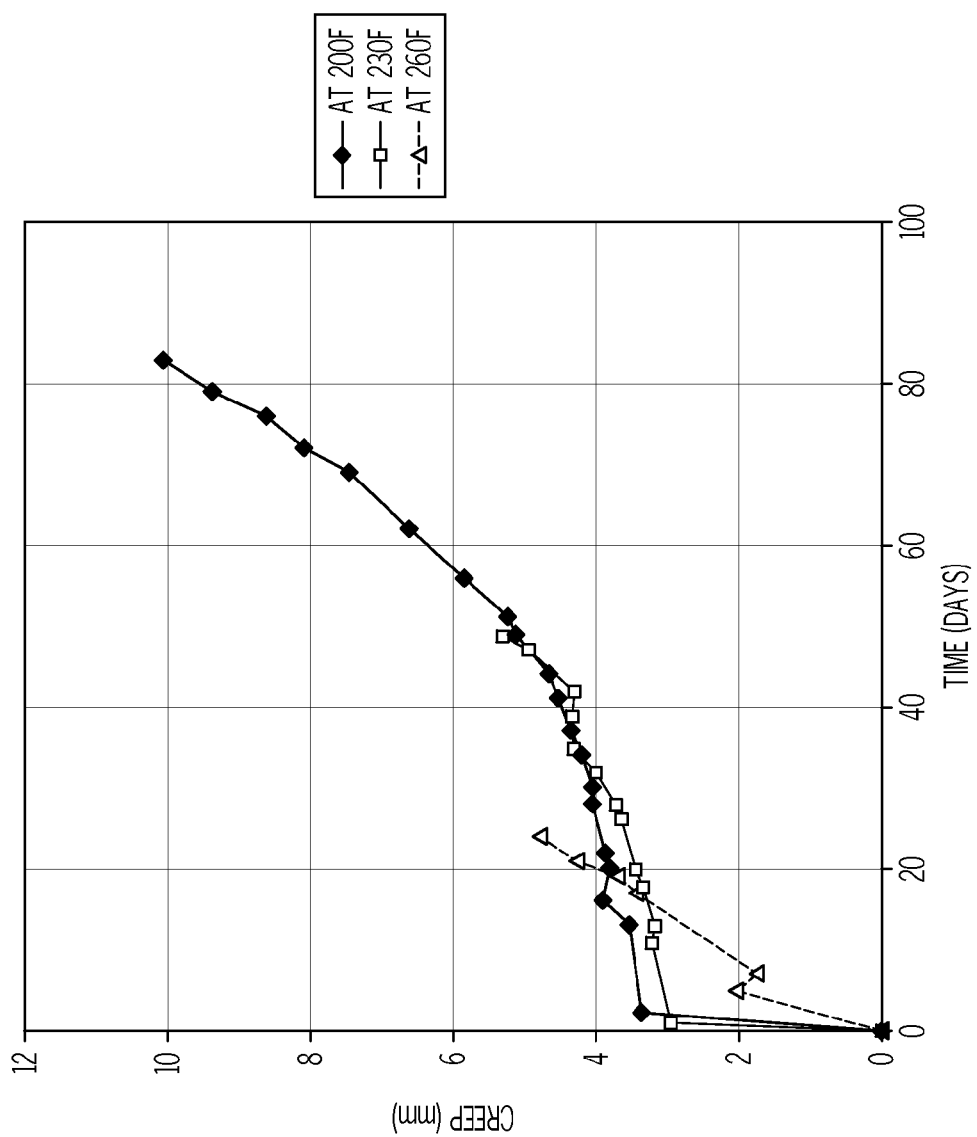
FIG. 5 is a plot of creep isotherms for Aremco-Bond™ 568 according to one embodiment of the present invention.
Figure 6:
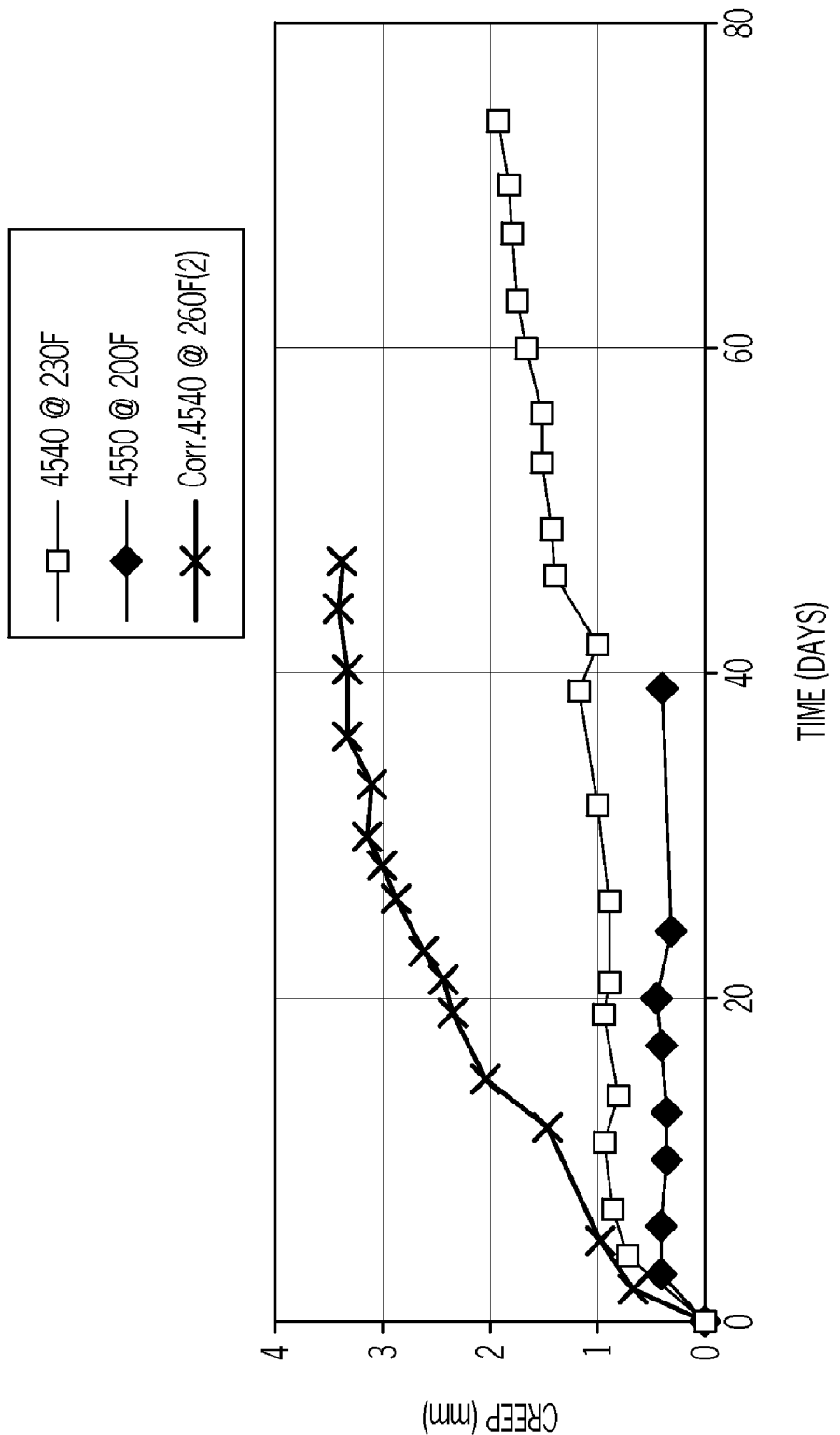
FIG. 6 is a plot of creep isotherms for Duralco® 4540 according to one embodiment of the present invention.

The creep isotherms for Aremco-Bond™ 568 at three temperatures are shown in FIG. 5. The creep isotherms for Duralco® 4540 at three temperatures are shown in FIG. 6. As can be seen in FIGS. 5 and 6, creep increased with time. For Duralco® 4540 the creep rate was higher at 260° F. compared to 230° F. and 200° F.

Figure 7:
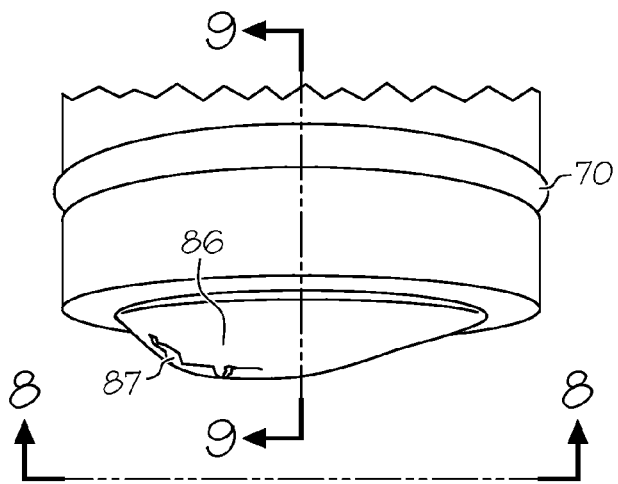
FIG. 7 is a perspective view of an Aremco-Bond™ 568 cast according to one embodiment of the present invention.
Figure 8:
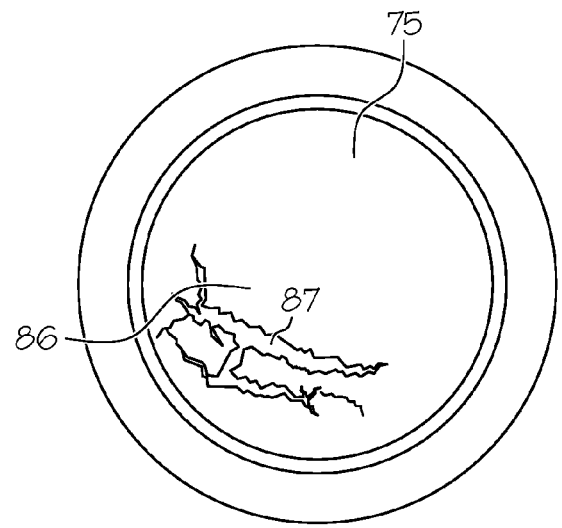
FIG. 8 is a view through line 8-8 of FIG. 7.
Figure 9:
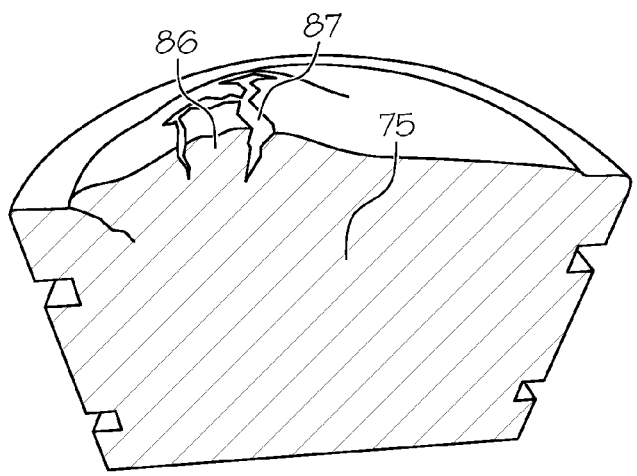
FIG. 9 is a view through line 9-9 of FIG. 7.

During testing, a hump 86 formed at the bottom, as shown in FIGS. 7-9, and cracks 87 appeared as the epoxy exceeded its stretching limits. The morphology visible in FIGS. 7-9 suggests that the epoxy cast is deforming or bending due to the stress on the surface rather than cracking. Further characterization revealed that the cracks 87 were limited to the surface and did not continue internally and that fibers were still properly adhered with epoxy. The hump 86 grew with time causing some shrinkage in cast diameter and as a result leaks occurred from the O-ring seal. The test could not continue because the unit was unable to hold pressure. The modules eventually leaked because the deformed modules did not press the O-rings firmly enough against the side of the housing. This change in failure mode has significant consequences for the design of the ASM. This phenomenon may be due to having aluminum fibers in the epoxy composition. More rigid or brittle epoxies tend to crack under stress and temperature, initial cracks continue to grow and eventually leak through the epoxy and effects selectivity. With the Aremco-Bond™ 568 sample, it was observed using microscopic examination of cross-sections of the failed samples that cracks, which appeared on the surface, did not continue throughout the length.

EXAMPLE 3

Figure 10:
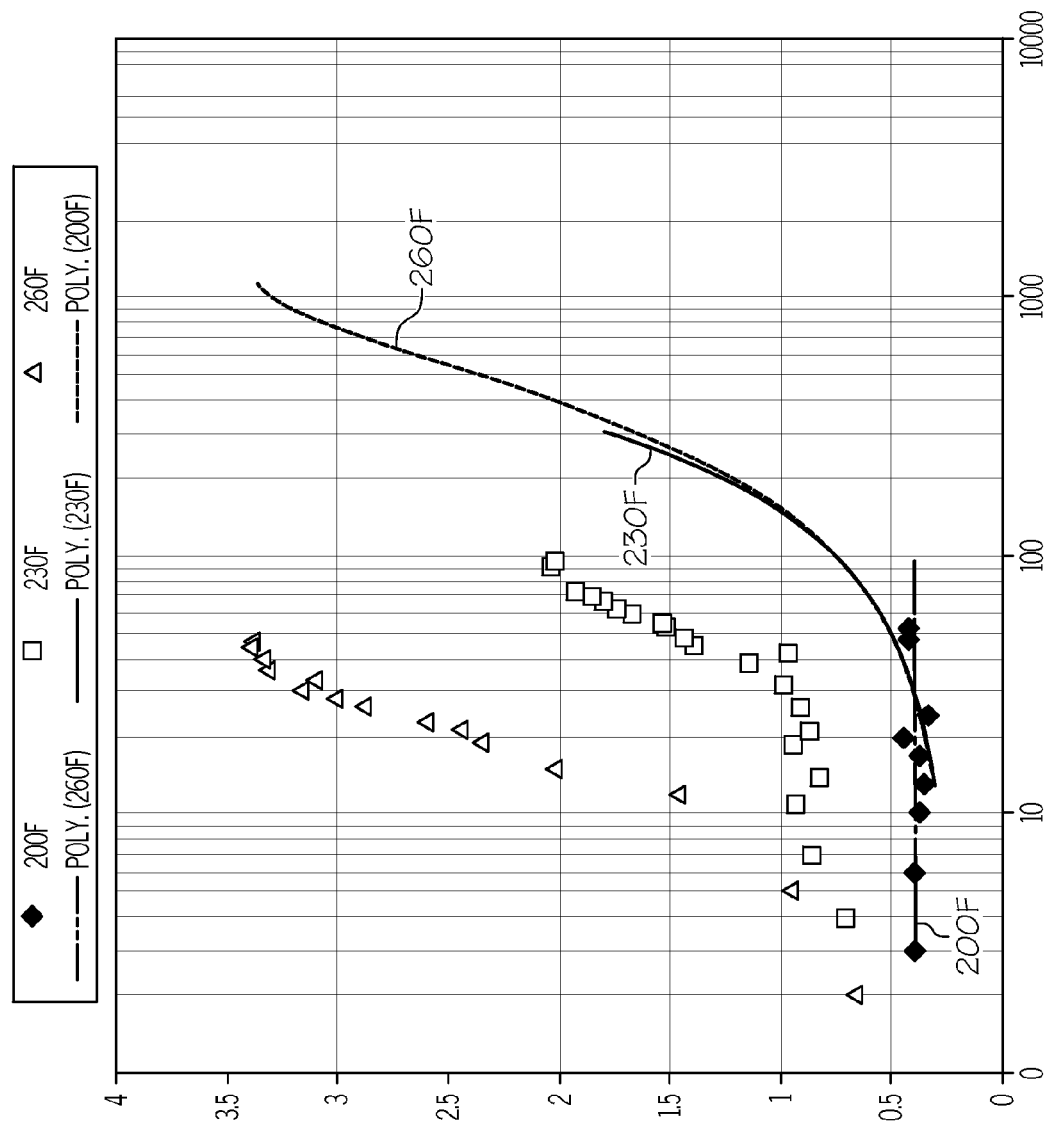
FIG. 10 is a Time-temperature superposition (TTS) plot for Duralco® 4540 according to one embodiment of the present invention.

Time-temperature superposition (TTS) was used to predict the long-term creep of the Duralco® 4540, as shown in FIG. 10. Time-temperature superposition (TTS) is a useful tool to look at the long-term mechanical properties of materials. It provides a unique way of estimating creep over time. As described by Sujan E. Bin Wadud in "Time-Temperature Superposition Using DMA Creep Data" (TA Instruments, Inc.), the concept of time-temperature superposition (TTS) comes from the observation that the time-scales of the motions of constituent molecules of a polymer are affected by temperature. More specifically, the motions occur at shorter times at higher temperature.

Creep curves were obtained at 200° F., 230° F., and 260° F. These curves were shifted along the time axis to generate a single curve known as the master curve, from which creep data can be obtained. The isotherm joins at a point where slopes of the lines are similar. Dr. C. J. Burgoyne summarizes the steps that are needed to obtain the master curve in "Time-Temperature Superposition to determine the Stress-Rupture of Aramid Fibers", University of Cambridge, Cambridge, UK (2006). The following steps are described. A material specimen is subjected to a constant load at a certain temperature as in conventional creep testing, and the variation of the creep of the specimen is observed against the log (time). Similar experiments are performed for each sample at different temperature levels and the relevant creep curves obtained. An arbitrary reference temperature is selected ($T_R$). All the individual creep curves corresponding to different temperature levels are shifted along the log (time) scale to superpose to a master curve.

In this example, predictions for long term durability at 200° F. can be made by using shorter term creep curves at 200° F., 230° F., and 260° F. As shown in FIG. 10, creep at 200° F. is predicted to be less than about 3.5 mm at 1000 hours.

EXAMPLE 4

Figure 11:
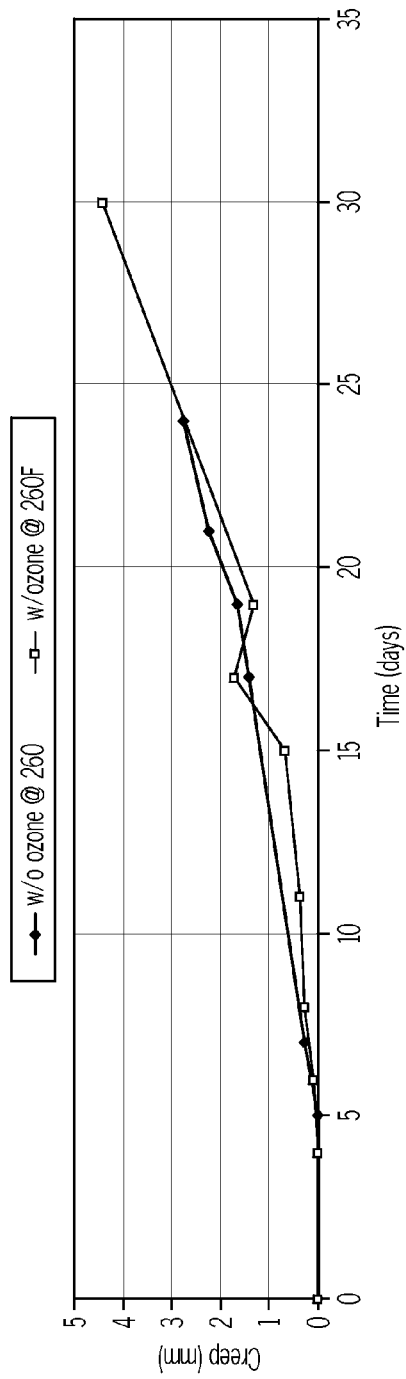
FIG. 11 is a plot of creep isotherms with and without ozone present for Aremco-Bond™ 568 according to one embodiment of the present invention.
Figure 12:
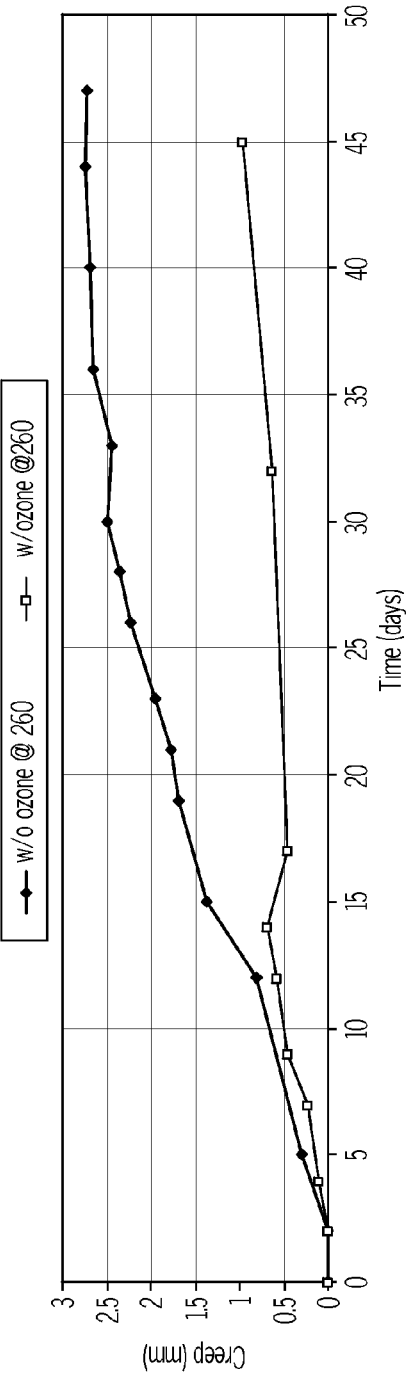
FIG. 12 is a plot of creep isotherms with and without ozone present for Duralco® 4540 according to one embodiment of the present invention.

To study the ozone effect on the epoxy, two modules were made with each epoxy for stress test. The modules were made using the procedures described above for Example 1. To test under these conditions, an ozone generator that can generate a stream of air with the required ozone concentration was set up. The ozone was monitored using a low concentration ozone monitor from PCI-Wedco Environmental Technologies. At first, the modules were kept in an ozone chamber, which was maintained at 0.1 ppm ozone and 260° F. for about 48 hours. The module was then tested under 200 psig pressure at 260° F., and creep was measured after each cycle. Creep with and without ozone was compared to see if ozone would have an effect. FIG. 11 shows the results for Aremco-Bond™ 568, and FIG. 12 shows the results for Duralco® 4540. As can be seen, the presence of ozone had little if any effect on the creep rate for Aremco-Bond™ 568. Because the presence of ozone reduced the creep rate for Duralco® 4540, Duralco® 4540 may be useful in applications where ozone is present.

EXAMPLE 5

To compare filled and unfilled epoxies, a series of modules were potted with either a filled epoxy or an unfilled epoxy. In this study the modules were directly potted with the aluminum shell 80 without the O-rings 70. Some unfilled epoxy modules comprised Epicure® Curing Agent 3164/EPON® Resin 8132. Epicure® Curing Agent 3164/EPON® Resin 8132 is an unfilled epoxy and is available from Shell Chemical Company. Some filled epoxy modules comprised Aremco-Bond™ 568. Aremco-Bond™ 568 is a filled epoxy and is available from Aremco Products.

Figure 13:
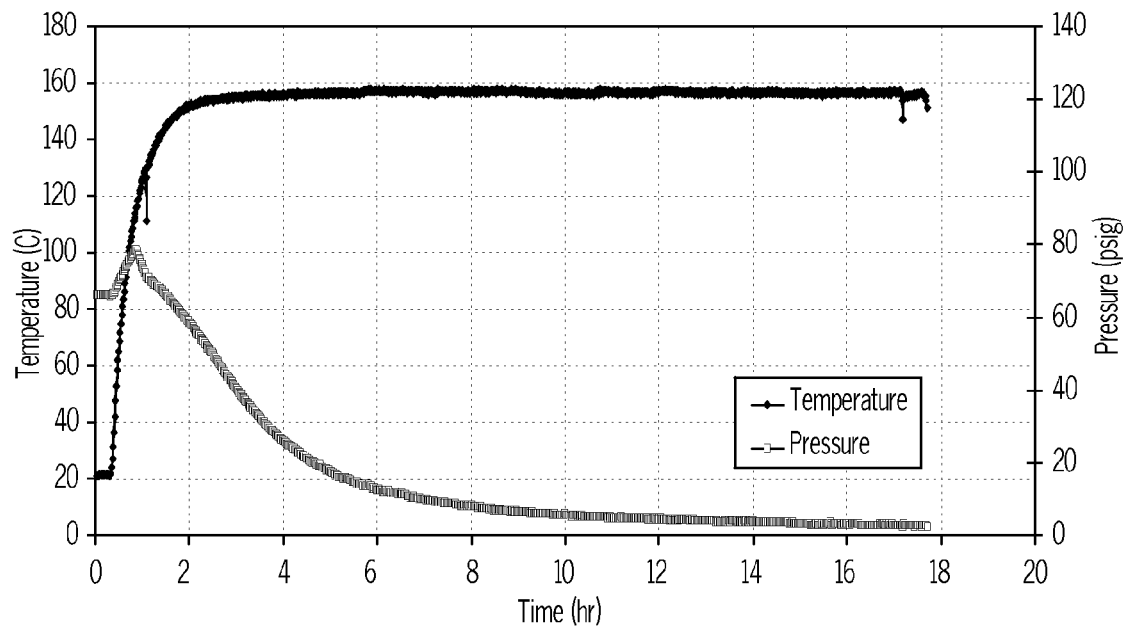
FIG. 13 is a plot of temperature and pressure as a function of time for Epicure® Curing Agent 3164/EPON® Resin 8132 according to one embodiment of the present invention.
Figure 14:
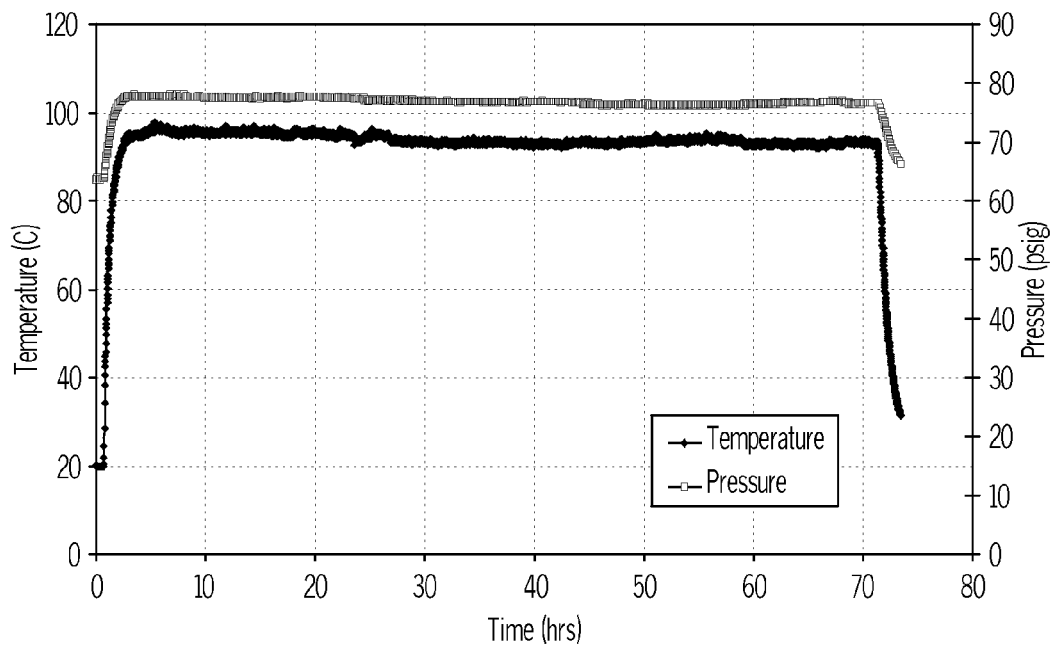
FIG. 14 is a plot of temperature and pressure as a function of time for Aremco-Bond™ 568 according to one embodiment of the present invention.

During the study temperature and pressure were measured and then plotted as a function of time. The results for Epicure® Curing Agent 3164/EPON® Resin 8132 are shown in FIG. 13. The results for Aremco-Bond™ 568 are shown in FIG. 14. As can be seen, the unfilled epoxy modules lost pressure and the test failed. The loss of pressure may be due to leaks through the unfilled epoxy.

Figure 15:
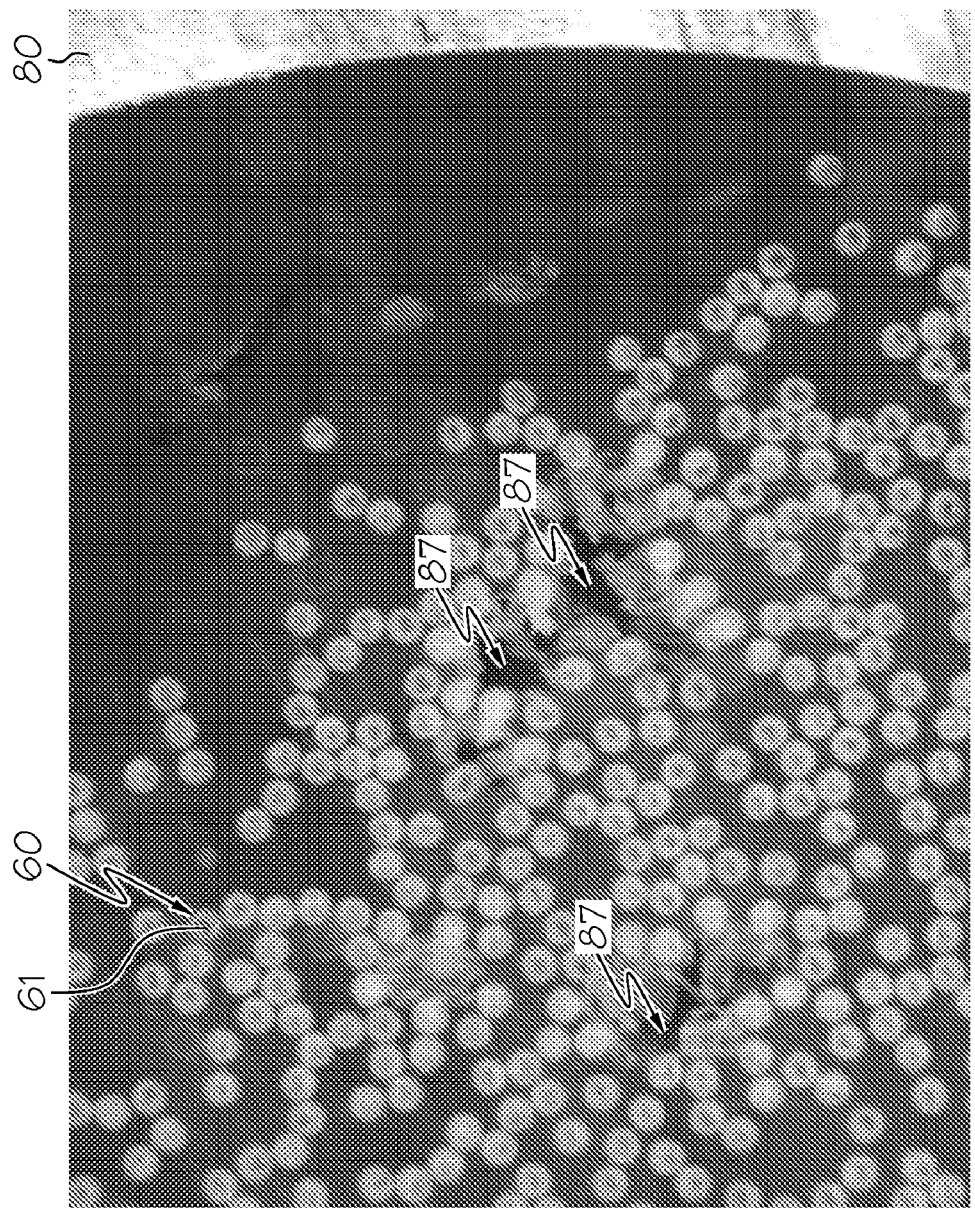
FIG. 15 is a plan view of an unfilled epoxy module.

For the unfilled epoxy modules, as depicted in FIG. 15, cracks 87 on the surface extended through the module resulting in leaks. In FIG. 15, the module comprised Duralco® 4461. Duralco® 4461 is an unfilled epoxy material available from Cotronics Corporation. In comparison the filled epoxy modules (see FIGS. 7-9) bent and cracks 87 on the surface did not extend through the module resulting in leaks.

As can be appreciated by those skilled in the art, the present invention provides improved tubesheets. Embodiments of the present invention provide filled epoxy tubesheets that can bend due to stress on the surface in lieu cracking and leaking. Embodiments of the present invention provide ASMs having improved performance.

It should be understood, of course, that the foregoing relates to exemplary embodiments of the invention and that modifications may be made without departing from the spirit and scope of the invention as set forth in the following claims.

We claim:

1. A tubesheet comprising:
   a polymer component; and
   a fill component disposed within said polymer component, wherein
   said polymer component and said fill component comprise a filled epoxy having a tensile strength of at least about 2500 psi; and
   said filled epoxy has a viscosity of at least about 30000 cps.

2. The tubesheet of claim 1, wherein said fill component comprises aluminum.

3. The tubesheet of claim 1, wherein said fill component is between about 10 and about 20 microns in size.

4. The tubesheet of claim 1, wherein said fill component comprises between about 5% and about 20% by volume of said tubesheet.

5. The tubesheet of claim 1, wherein said fill component comprises at least one of aluminum, silver, nickel, copper, brass, and steel.

6. The tubesheet of claim 1, wherein said polymer component includes a thermosetting resin-based material.

7. The tubesheet of claim 1, wherein said polymer component comprises epoxy.

8. The tubesheet of claim 1, further comprising an insert disposed within said polymer component.

9. The tubesheet of claim 1, wherein said tubesheet comprises an air separation module tubesheet.

10. A tubesheet comprising an aluminum filled epoxy, wherein the aluminum filled epoxy includes aluminum flakes and has a viscosity of at least 30000 cps.

11. The tubesheet of claim 10, wherein said aluminum filled epoxy has a tensile strength of at least about 2000 and about 10000 psi.

12. The tubesheet of claim 10, wherein said aluminum filled epoxy has a Coefficient of thermal expansion of between about $3.3 \times 10^{-5}/°C$. and about $8.0 \times 10^{-5}/°C$.

13. The tubesheet of claim 10, wherein said aluminum filled epoxy has a Shore hardness of between about 75 and about 95.

14. The tubesheet of claim 10, wherein said aluminum filled epoxy has a recommended maximum use temperature of at least about 400° F.

15. The tubesheet of claim 10, wherein said tubesheet includes at least one o-ring groove.

16. The tubesheet of claim 10, wherein said aluminum flakes have a size between about 10 and about 20 microns.

17. A method of securing a supply of fibers comprising the step of:
    preheating a supply of resin and a supply of hardener to a temperature of about 60° C. to provide a supply of preheated resin and a supply of preheated hardener;
    mixing a first portion of said preheated resin with a first portion of said preheated hardener to provide a first portion of filled epoxy;
    wetting said supply of fibers with said first portion of filled epoxy to provide a supply of wetted fibers;
    mixing a second portion of said preheated resin with a second portion of said preheated hardener to provide a second portion of filled epoxy; and
    potting said supply of wetted fibers in said second portion of filled epoxy to provide a supply of potted fibers, wherein said second portion of filled epoxy has a viscosity of at least 30000 cps.

18. The method of claim 17, wherein said step of potting said supply of wetted fibers in said second portion of filled epoxy to provide a supply of potted fibers includes positioning an insert in a cylinder and then pouring said second portion of filled epoxy into said cylinder.

19. The method of claim 17, wherein said step of potting said supply of wetted fibers in said second portion of filled epoxy to provide a supply of potted fibers includes:
    clamping said supply of wetted fibers to a stand to provide a supply of clamped fibers;
    pouring said second portion of filled epoxy into a cylinder;
    positioning said cylinder beneath said supply of clamped fibers; and
    raising said cylinder such that said second portion of filled epoxy contacts said supply of clamped fibers.

\* \* \* \* \*